US012592024B2

(12) United States Patent
Mulchandani et al.

(10) Patent No.: US 12,592,024 B2
(45) Date of Patent: Mar. 31, 2026

(54) QUANTIFICATION OF SENSOR COVERAGE USING SYNTHETIC MODELING AND USES OF THE QUANTIFICATION

(71) Applicant: Schlumberger Technology Corporation, Sugar Land, TX (US)

(72) Inventors: Kishore Mulchandani, Henderson, NV (US); Bernard Van Haecke, Mountain View, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 264 days.

(21) Appl. No.: 18/537,024

(22) Filed: Dec. 12, 2023

(65) Prior Publication Data

US 2024/0193849 A1 Jun. 13, 2024

Related U.S. Application Data

(60) Provisional application No. 63/387,116, filed on Dec. 13, 2022.

(51) Int. Cl.
*G06T 15/06* (2011.01)
*G05D 1/246* (2024.01)
(Continued)

(52) U.S. Cl.
CPC ........... *G06T 15/06* (2013.01); *G05D 1/2465* (2024.01); *G05D 1/646* (2024.01); *G05D 1/689* (2024.01); *G05D 2111/10* (2024.01)

(58) Field of Classification Search
CPC ...... G06T 15/06; G05D 1/689; G05D 1/2465; G05D 2111/10
(Continued)

(56) References Cited

U.S. PATENT DOCUMENTS 9,536,019 B2    1/2017  Sandberg et al.
2011/0043521 A1*  2/2011  Smyth .................... G06T 15/06
                                                       345/419
(Continued)

FOREIGN PATENT DOCUMENTS

EP          4202841 A1    6/2023
JP      2011100306 A    5/2011
(Continued)

OTHER PUBLICATIONS

International Search Report and Written Opinion of International Patent Application No. PCT/US2023/083594, dated Apr. 16, 2024, 10 Pages.

*Primary Examiner* — Jin Ge
(74) *Attorney, Agent, or Firm* — Kyle R. Miiller

(57)            ABSTRACT

A method including receiving a data structure including a model including a virtual object. The virtual object has spatial elements that form an area of the virtual object. The method also includes applying a ray tracing algorithm to the model. The ray tracing algorithm directs virtual rays from a remote point in the model towards the virtual object. The method also includes determining intersection values. Each of the intersection values represents a corresponding number of times that the virtual rays intersect a corresponding one of the spatial elements. The method also includes generating, from the intersection values, a coverage value representing a percentage of the area that is covered by the virtual rays. The method also includes returning the coverage value.

20 Claims, 6 Drawing Sheets

(51) Int. Cl.
    *G05D 1/646*      (2024.01)
    *G05D 1/689*      (2024.01)
    *G05D 111/10*    (2024.01)

(58) Field of Classification Search
    USPC ........................................................ 345/426
    See application file for complete search history.

(56)            References Cited

U.S. PATENT DOCUMENTS

| | | | |
|---|---|---|---|
| 2015/0046129 A1* | 2/2015 | Sandberg | H04N 7/181 |
| | | | 703/1 |
| 2015/0323321 A1 | 11/2015 | Oumi | |
| 2023/0186568 A1* | 6/2023 | Ichim | G06T 7/593 |
| | | | 345/419 |
| 2024/0290049 A1* | 8/2024 | Prideaux-Ghee | G06T 19/006 |

FOREIGN PATENT DOCUMENTS

| | | | |
|---|---|---|---|
| JP | 2019207153 A | 12/2019 | |
| KR | 20150017687 A | 2/2015 | |
| KR | 20220084805 A | 6/2022 | |
| WO | 2020223594 A2 | 11/2020 | |
| WO | 2022023199 A1 | 2/2022 | |

* cited by examiner

START

RECEIVE A DATA STRUCTURE INCLUDING A MODEL HAVING A VIRTUAL OBJECT ⟋ 200

APPLY A RAY TRACING ALGORITHM TO THE MODEL ⟋ 202

DETERMINE INTERSECTION VALUES ⟋ 204

GENERATE, FROM THE INTERSECTION VALUES, A COVERAGE VALUE REPRESENTING A PERCENTAGE OF THE AREA THAT IS COVERED BY THE VIRTUAL RAYS ⟋ 206

RETURN THE COVERAGE VALUE ⟋ 208

END

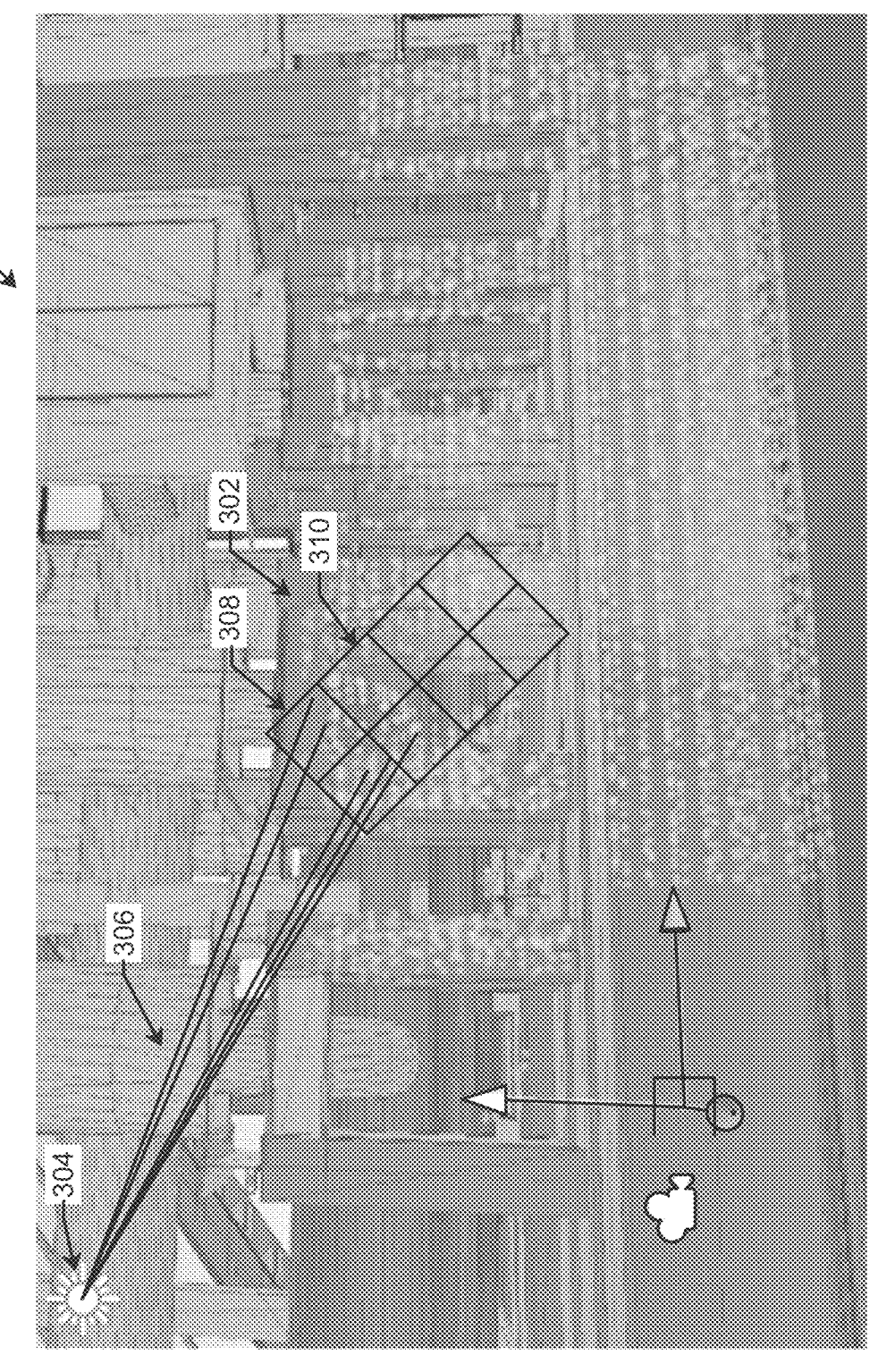
*FIG. 3.1*

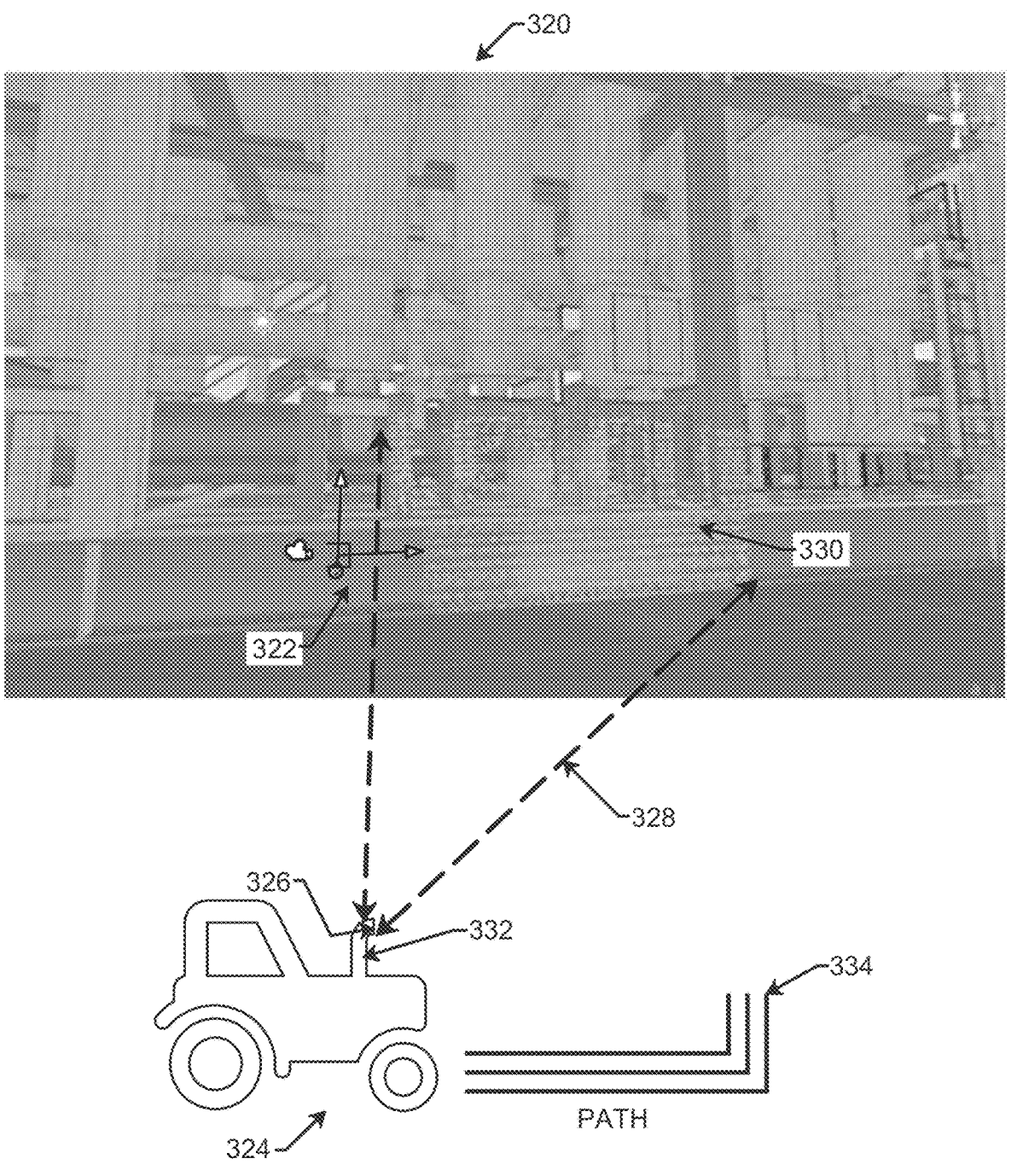
*FIG. 3.2*

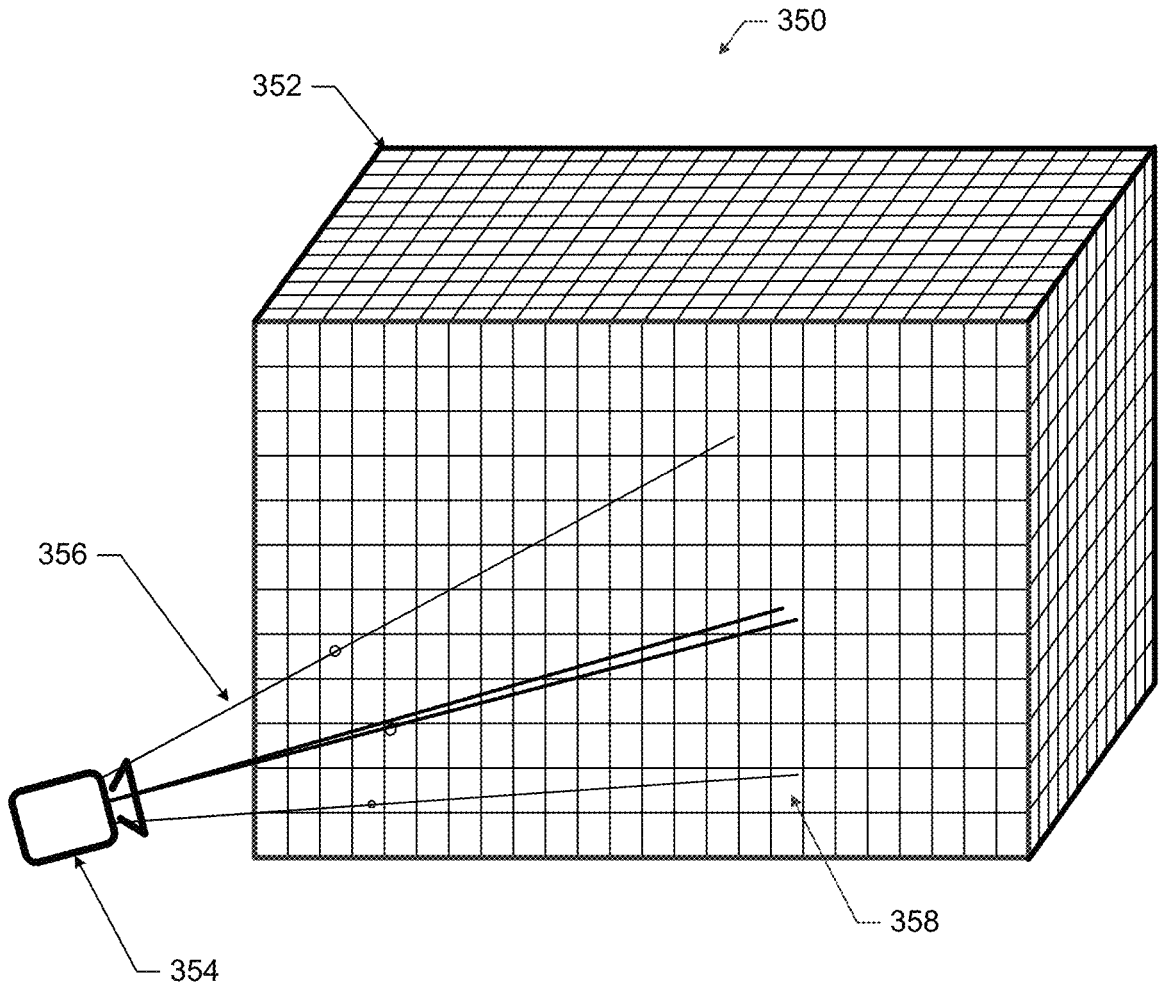
*FIG. 3.3*

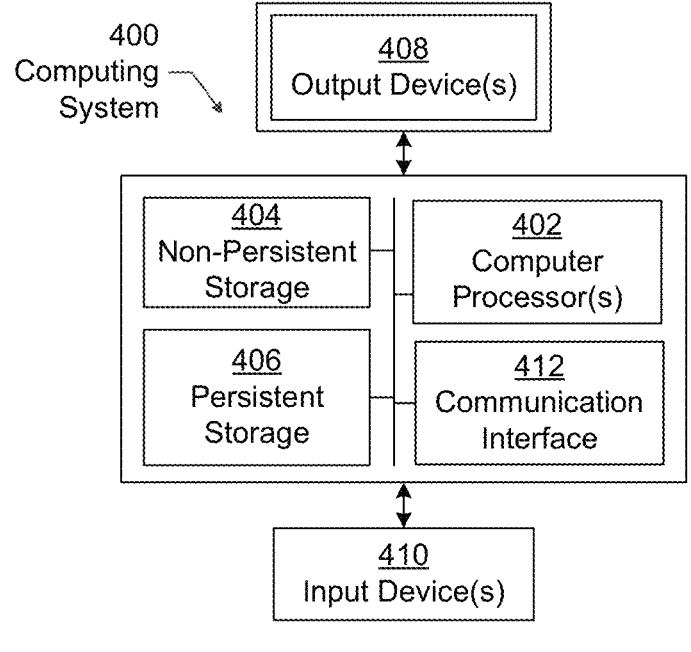
400
Computing
System
408
Output Device(s)
404
Non-Persistent
Storage
402
Computer
Processor(s)
406
Persistent
Storage
412
Communication
Interface
410
Input Device(s)
*FIG. 4.1*
420
Network
422
Node X
● ● ●
424
Node Y
426
Client Device
*FIG. 4.2*

QUANTIFICATION OF SENSOR COVERAGE USING SYNTHETIC MODELING AND USES OF THE QUANTIFICATION

CROSS-REFERENCE TO RELATED APPLICATIONS

This application claims priority to U.S. Provisional Patent Application 63/387,116, filed Dec. 13, 2022, the entirety of which is hereby incorporated by reference.

BACKGROUND

One or more robots with payloads of sensors may be used to scan and capture datasets of one or more objects in a real environment (e.g., equipment in a manufacturing facility). Stationary sensors also may be used to monitor a real environment. The scanning could be for the purposes of performing 3D reconstruction or detecting damage or any other type of anomaly. A robot may be able to move along a certain path to capture the raw data that can later be processed for recreating the models.

The sensing process may be subject to difficulties due to the effects of the location of the sensor(s), the type of sensor(s) used, the path of any robot(s) used, the optical properties of the one or more objects (e.g., reflectivity, refractivity, absorptivity, etc.), the angle at which any beams projected by the sensor(s) strike the one or more objects, and possibly many other conditions. Taken together, the total effect of the such conditions may be to reduce, or overcompensate, the amount of sensor coverage applied to the object.

Too little sensing coverage may be undesirable, as inaccuracies may arise when measuring the one or more objects using one or more sensors. Too much sensor coverage also may be undesirable, as an undesirable amount of processing power may be used to process excess data while measuring the one or more objects using one or more sensors.

Thus, it may be desirable to optimize the amount of sensor coverage. Optimizing the sensor coverage may be considered sufficient sensor coverage such that a desirable accuracy is attained, but also that not so much data is collected than an undue amount of processing resources are used while measuring the one or more objects using one or more sensors.

SUMMARY

One or more embodiments provide for a method. The method includes receiving a data structure including a model including a virtual object. The virtual object has spatial elements that form an area of the virtual object. The method also includes applying a ray tracing algorithm to the model. The ray tracing algorithm directs virtual rays from a remote point in the model towards the virtual object. The method also includes determining intersection values. Each of the intersection values represents a corresponding number of times that the virtual rays intersect a corresponding one of the spatial elements. The method also includes generating, from the intersection values, a coverage value representing a percentage of the area that is covered by the virtual rays. The method also includes returning the coverage value.

Other aspects of one or more embodiments will be apparent from the following description and the appended claims.

BRIEF DESCRIPTION OF DRAWINGS

FIG. 3.1, FIG. 3.2, and FIG. 3.3 show an example of a method for quantification of sensor coverage using synthetic modeling and uses of the quantification, in accordance with one or more embodiments.

FIG. 4.1 and FIG. 4.2 show a computing system and network environment, in accordance with one or more embodiments.

Like elements in the various figures are denoted by like reference numerals for consistency.

DETAILED DESCRIPTION

Figure 1:
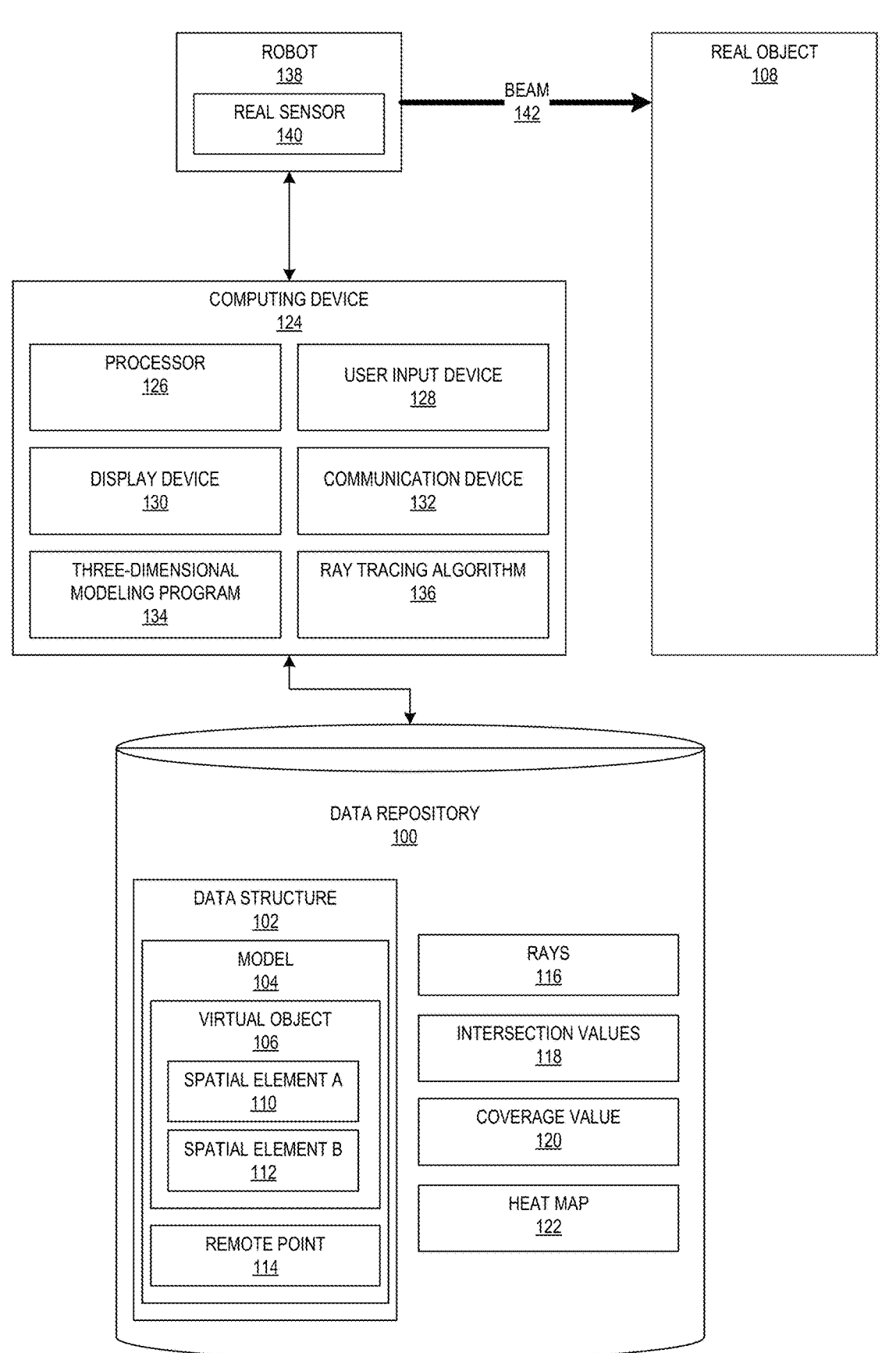
FIG. 1 shows a computing system, in accordance with one or more embodiments.

In general, embodiments are directed to optimizing sensor coverage when using real sensors to measure real objects. For convenient reference, the process of measuring one or more real objects using one or more real sensors may be referred to as "sensing," regardless of the number of real objects measured, the number of real sensors used, and the exact nature of the sensors or sensing techniques used. Thus, for example, one or more embodiments are not necessarily limited to determining sensing coverage for specific sensing techniques, such as RADAR or LIDAR profiling, photogrammetry, spectroscopy, etc., but may be applicable to any such techniques. As used herein, the term "scan" is synonymous with the above definition of "sensing."

One or more embodiments may be used to optimize the amount of sensor coverage provided by one or more sensors during sensing of the one or more objects. The optimization process may take into account various conditions that may apply, such as the effects of the location of the sensor(s), the type of sensor(s) used, the path of any robot(s) used, the optical properties of the one or more objects (e.g., reflectivity, refractivity, absorptivity, etc.), the angle at which any beams projected by the sensor(s) strike the one or more objects, and possibly many other conditions.

In general, one or more embodiments model the sensing process and optimize the sensor coverage in the model. The results of the modeling and optimization may be used to change one or more of the conditions specified during a corresponding real sensing process.

The one or more objects the real world may be represented by a digital proxy, such as a three dimensional (3D) rendering of the one or more real objects. The 3D rendering may be added to a model (a virtual environment that includes the 3D rendering).

A ray tracing algorithm may perform ray casting and projection within the model. The paths or behavior of the rays may be altered or weighted in the model to account for the conditions described above.

The virtual object is segmented into a number of spatial elements (e.g., polygons). The number of times one or more rays strike each spatial element in the model is counted. The number of strikes in each spatial element may be compared to other spatial elements, and may be used to estimate a total coverage of the rays during the ray tracing algorithm. The coverage, or the variation in coverage, then may be used to modify one or more of the conditions in the real world in order to optimize the real sensing process.

One or more embodiments address a number of technical objectives. For example, one or more embodiments may be used to obtain a visual as well as a quantitative measure of the coverage area that a sensor covers. The quantitative measure of coverage may then be used to design robot missions or to design new robots or new sensor suites to place on robots. In a specific example, if a determination made that there is too much sensor coverage, then a sensor payload might be reduced or simplified in order to reduce the amount of data collected and thereby reduce the processing resources used to process the data collected. In another example, the sensors may not be the right type of sensor to capture desired data for the desired application. In this case, the coverage determination in the model may be used to design new or additional sensors to be placed on the robot, or to use available sensors and determine where to place the available sensors on new locations on the robot (or upon a stationary surface).

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a data structure (102). The data repository (100) is a data organization, management, and storage format that is computer-readable. A data structure also may be characterized as a collection of data values, the relationships among the data values, and the functions or operations that can be applied to the data values.

The data structure (102) may store information that a computer may interpret as being a model (104). The model (104) is a virtual construct within a computer environment. While the model (104) may portray representations of objects in the real world, or the space around those objects, the model (104) itself is a computer construct and may be manipulated by a computer.

The model (104) includes a virtual object (106). The virtual object (106) may be a modeled virtual representation of a real object. However, in some embodiments, the virtual object (106) may not correspond to a real object, such as when the virtual object (106) represents a real object which is in a design phase before the real object is manufactured or constructed.

The virtual object (106) may be sub-divided into a number of spatial elements, such as spatial element A (110) and spatial element B (112). Each spatial element, including the spatial element A (110) and the spatial element B (112), is an area within the model (104) defined with respect to the virtual object (106). In particular, each spatial element may represent a portion of the surface or volume of the virtual object (106). In an embodiment, areas in the model (104) other than the virtual object (106) also may be represented by spatial elements, such as when it may be desirable to perform ray tracing on virtual objects or areas of the model (104) other than the virtual object (106).

The data repository (100) also may store a remote point (114). The remote point (114) is a point, area, or volume within the model (104) from which the rays (116) (defined below) emanate. In other words, the remote point (114) is a virtual construct that represents the location of a real sensor. In an embodiment, the remote point (114) may include multiple remote points within the model (104).

The data repository (100) also stores one or more rays (116). The rays (116) are lines that are defined from the remote point (114) to one or more of the spatial elements (e.g., the spatial element A (110) and the spatial element B (112)) of the virtual object (106) or other spatial elements defined within the model (104). The term "defined" in the above description of rays means that the ray tracing algorithm generates and traces the rays at least in a computer data processing sense, whether or not the rays are drawn on a user interface in a manner visible to a human observer.

The rays (116) may be straight rays or curved rays. The rays (116) may reflected rays, scattered rays, or refracted rays that altered a path of the initial rays initially emitted from the remote point (114) within the model (104). In other words, the rays (116) may not be directly traceable at one end back to the remote point (114).

The rays (116) may represent real beams emitted by one or more real sensors in a real environment that includes a real object that corresponds to the virtual object (106). Thus, for example, straight rays may be used when the real beams from the real sensors are light rays. However, curved rays may be used when the real beams from the real sensors are sound waves.

The data repository (100) also stores one or more intersection values (118). The intersection values (118) are numbers identifying the number of times one or more of the rays (116) intersect with a corresponding one of the spatial elements. For example, if five of the rays (116) intersected the spatial element A (110), then the intersection values (118) of the spatial element A (110) would be five.

Figure 2:
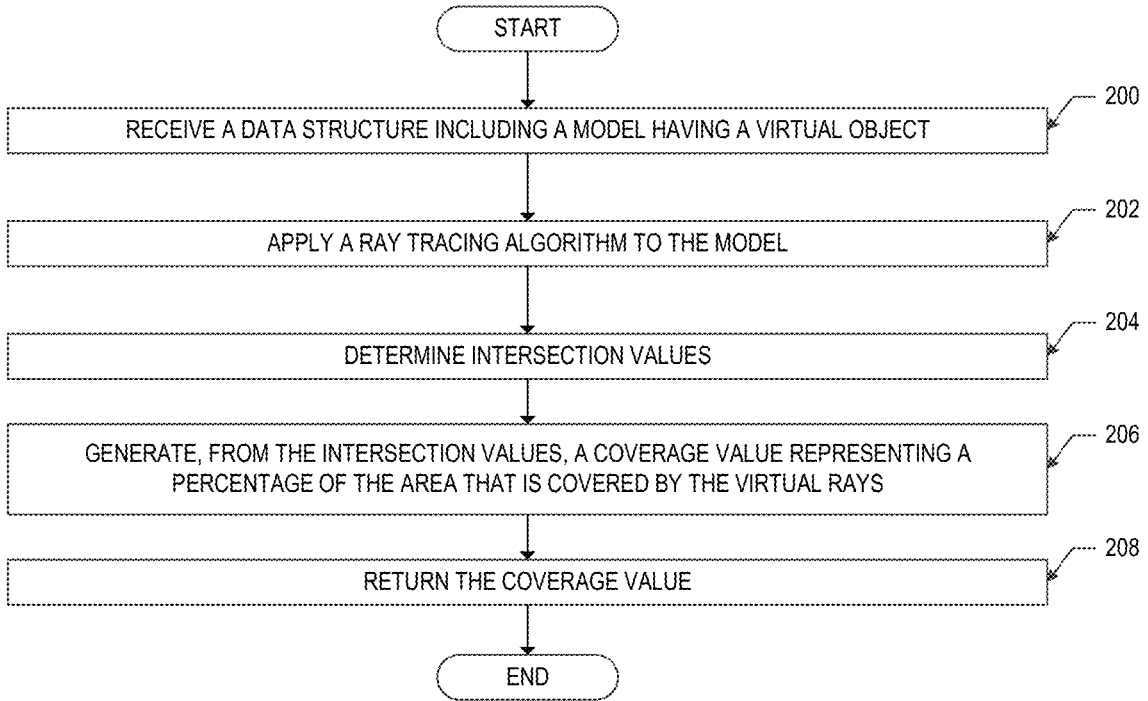
FIG. 2 shows a flowchart of a method for quantification of sensor coverage using synthetic modeling and uses of the quantification, in accordance with one or more embodiments.

The data repository (100) also stores a coverage value (120). The coverage value (120) may be a number that represents a percentage of the total area of the virtual object (106) that is covered by the rays (116). The precise meaning of the coverage value (120), quantitatively and qualitatively, depends on how the coverage value (120) is determined. FIG. 2 describes different techniques for determining the coverage value (120), and each technique has a corresponding meaning as described with respect to step 206 of FIG. 2.

The data repository (100) also may store a heat map (122). The heat map (122) is a visual map of the determined coverage of the region by the sensors. The heat map may show the collection of spatial elements where the spatial elements are highlighted (e.g., colored, grayed, outlined, etc.) differently depending on the intersection values (118) of each of the spatial elements. Thus, for example, the spatial element A (110) of the virtual object (106) may be colored red when fewer than a threshold number of the rays (116) intersect the spatial element A (110), and the spatial element B (112) may be colored green when the threshold number of the rays (116) intersect the spatial element B (112).

The system shown in FIG. 1 also may include a computing device (124). The computing device (124) may be the computing system (400) shown in FIG. 4.1. The computing device (124) may be one or more computers, possibly operating in a distributed computing environment.

The computing device (124) includes a processor (126). The processor (126) is one or more processors, and may be virtual processors, hardware processors, or a combination thereof. The processor (126) may be the compute processor(s) (402) shown in FIG. 4.1.

The computing device (124) may include a user input device (128). The user input device (128) is a device that permits a user to interact with the computing device (124). The user input device (128), for example, may be a mouse, keyboard, touchscreen, microphone, etc.

The computing device (124) also may include a display device (130). The display device (130) is a device that permits a user to view or sense information which the processor (126) commands to be displayed on the display device (130). The display device (130) may be a monitor, television, touchscreen, audio speaker, haptic device, etc.

The computing device (124) also may include a communication device (132). The communication device (132) is hardware or software which permits the computing device (124) to communicate with other computing devices. Thus, the communication device (132) may be a universal serial bus (USB), an ethernet port, a communication stack, etc.

The computing device (124) also includes a three-dimensional modeling program (134). The three-dimensional modeling program (134) may be software or application specific hardware which permits the computing device (124) to generate the model (104), the virtual object (106), the spatial elements, and the rays (116). An example of the three-dimensional modeling program (134) may be a computer assisted design (CAD) program.

The computing device (124) also includes a ray tracing algorithm (136). The ray tracing algorithm (136) is software or application specific hardware which permits the processor (126) to generate the rays (116) in the model (104).

The system shown in FIG. 1 also may include other components. For example, the system may include a robot (138). The robot (138) is a real device. The robot (138) is one or more cybernetic devices which may be commanded by the computing device (124), or operate autonomously, to move at least some of the parts of the robot (138). The robot (138) may be a static platform, in which case the robot (138) stays static with respect to a real object, but in this case the robot (138) may include components which are movable relative to the platform. The robot (138) also may be a mobile platform, in which case the platform is mobile with respect to a real object. In an embodiment, a mobile platform robot also may include movable sub components that permit other parts of the robot to move relative to the platform.

The robot (138) may include one or more sensors, such as a real sensor (140). The real sensor (140) is a device which may sense a physical parameter. The real sensor (140) may include active or passive components. An active components transmits a beam (142) towards the real object (108). One or more passive sensors may then measure reflected, scattered, or refracted beams that arise as a result of actively transmitting the beam (142) towards the real object (108). Thus, a passive sensor measures some physical property without transmitting the beam (142).

Examples of active sensors include laser direction and ranging (LIDAR), radio direction and ranging (RADAR), acoustic sensors such as sound navigation and ranging (SONAR), emission spectroscopic devices, etc. Examples of passive sensors include cameras, charged coupled devices (CCDs), microphones, etc.

The beam (142), in turn, is an emission from an active component of the real sensor (140). The beam (142) may be light, sound, or any other emission from the active component of the real sensor (140). Thus, the beam (142) may be straight (e.g., a light beam traveling within one or more media having one index of refraction) or curved (e.g., a sound wave, a light beam traveling between media having different indices of refraction), etc.

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for quantification of sensor coverage using synthetic modeling and uses of the quantification, in accordance with one or more embodiments. The method of FIG. 2 may be implemented using the system of FIG. 1, possibly using one or more components of the computing system (400) shown in FIG. 4.1 and FIG. 4.2.

Step 200 includes receiving a data structure including a model having a virtual object. The virtual object includes two or more spatial elements that form an area of the virtual object. The data structure may be received or called by a processor by retrieving or receiving a pre-defined model stored in a data repository. The data structure may be received by defining the model in a CAD program and then proceeding with the rest of the method of FIG. 2.

Step 202 includes applying a ray tracing algorithm to the model. The ray tracing algorithm directs two or more rays from a remote point in the model towards the virtual object. The ray tracing algorithm may be applied to the model by the processor commanding the ray tracing algorithm to generate the rays in the model. The ray tracing algorithm may be used to determine a number of the rays based on a sampling frequency of a real sensor.

Step 204 includes determining two or more intersection values. Each of the intersection values represents a corresponding number of times that one or more of the rays intersect a corresponding one of the spatial elements. Determining may be performed by the processor counting the number of times that one or more of the rays intersect with a given spatial element of the virtual object or some other spatial element defined for the model. Note that one ray may generate more than one intersection value for a given spatial element, such as when a ray reflects, scatters, or refracts from some virtual surface within the model and returns back to the given spatial element for a second (or subsequent) time. Likewise, a single ray may intersect multiple objects, thereby contributing to the intersection value of more than one spatial element.

Step 206 includes generating, from the two or more intersection values, a coverage value representing a percentage of the area that is covered by the two or more virtual rays. Generating the coverage value may be performed by a number of different techniques.

The coverage value may be determined by taking a ratio of the sum of the areas of spatial elements that were hit over the total area of the virtual object. The coverage value may be determined for a convex hull using the U, V, and W coordinates of the intersections of the rays with the spatial elements, in which case the ratio of the volume of the convex hull to that of a whole cube may be a fractional measure of coverage (i.e., the coverage value). The coverage value also may be a sum of the intersection values divided by the total number of the rays initially transmitted from the remote point. The coverage value also may be a number that represents a percentage of the total number of spatial elements for which the corresponding intersection values satisfy a threshold value, relative to the total number of spatial elements for which the corresponding intersection values fail to satisfy the threshold value.

Other techniques for determining the coverage value are also possible. Thus, the examples provided above do not necessarily limit how the coverage value is determined at step 206.

Step 208 includes returning the coverage value. The coverage value may be returned in a number of different manners. The coverage value may be returned by storing the coverage value in a data repository. The coverage value may be returned by providing the coverage value to some other computer program which takes the coverage value as input. The coverage value may be returned by presenting the coverage value to a display device of a user device. The coverage value may be returned by other techniques, as well.

The method of FIG. 2 may be varied, extended, or expressed in different embodiments. For example, consider a case in which the virtual object corresponds to a real object having a real area and the remote point corresponds to a real sensor configured to emit a real beam. In this case, the method of FIG. 2 also may include adjusting, based on the coverage value, the real sensor. Adjusting changes a percentage of the real area of the object covered by the real beam emitted by the real sensor. In this manner, the method of FIG. 2 may be used to optimize, mathematically speaking, the coverage of the real object (thereby minimizing unnecessary excess coverage while minimizing under coverage).

If the real sensor is a static sensor, then the method also may include adjusting, based on the coverage value, the real sensor by adjusting at least one of a position of the real sensor, a sampling rate of the real sensor, and an operation of the real sensor. Adjusting changes a percentage of the real area of the object covered by the real beam emitted by the real sensor. Thus, again, the method of FIG. 2 may be used to optimize, mathematically speaking, the coverage of the real object (thereby minimizing unnecessary excess coverage while minimizing under coverage).

In another embodiment, the real sensor may be multiple real sensors disposed on a robot. In this case, adjusting the real sensor may include modifying at least one of real sensors in the manner described above.

In another embodiment, the virtual object corresponds to a real object having a real area, and the remote point corresponds to a real sensor disposed on a robot and configured to emit a real beam. In this case, the method also includes adjusting, based on the coverage value, the real sensor by adjusting a movement path taken by the robot. Adjusting the path of the robot (e.g., changing the route the robot takes or the speed at which the robot moves (in the case of a mobile platform)) may change the coverage of individual sub-areas of the real object.

In any case, adjusting changes a percentage of the real area of the object covered by the real beam emitted by the real sensor. Thus, again, the method of FIG. 2 may be used to optimize, mathematically speaking, the coverage of the real object (thereby minimizing unnecessary excess coverage while minimizing under coverage).

For example, the real sensor may be at least a first sensor mounted on a robot and a second sensor that is statically mounted relative to the real object. In this case, the method includes adjusting, based on the coverage value, at least one of a path of the robot and an orientation or position of the static sensor. As described above, adjusting changes a percentage of the real area of the object covered by the real beam emitted by at least one of the first sensor and the second sensor. Thus, again, the method of FIG. 2 may be used to optimize, mathematically speaking, the coverage of the real object (thereby minimizing unnecessary excess coverage while minimizing under coverage).

In another embodiment, step 204 (determining the intersection values) may include a sub-step of modifying the intersection values before generating the coverage value. Modifying the intersection values may be based on expected real physical properties of the object or the real environment near the object, which may affect the behavior of the real beams that the real sensors may use or measure when sensing the real object.

One technique for modifying the intersection values may be to determine an estimated scattering property of a real object which corresponds to the virtual object, and then modifying an expected number of intersecting rays accordingly. For example, if real beams are expected to reflect from one or more surfaces in the real environment, then more or fewer rays may intersect a given spatial area, depending on the orientation of the spatial elements (or the relative orientations of corresponding real sub-areas of the object) relative to each other.

Other properties may similarly affect or be the basis for modifying the intersection values. Such properties may include an estimated refraction property of a real object which corresponds to the virtual object, an estimated reflection property of a real object which corresponds to the virtual object, an estimated absorption property of a real object which corresponds to the virtual object, and an estimated bounce property of a real beam emitted by a real sensor. Still other properties may be the basis for modifying one or more of the intersection values of the spatial elements.

A similar result may be accomplished by modifying the behavior of the ray tracing algorithm at step 202 (e.g., by modifying the paths, frequency, sampling rate, etc. of the rays used). Example of varying the rays may include varying the angles at which the virtual rays intersect the spatial elements. In another example, a distance between the remote point and the virtual object may be varied. The rays may be curved, bent, or otherwise modified, depending on an expected physical behavior of the corresponding beams in the real world.

In an embodiment, a combination of adjusting the rays and adjusting the intersection values may be performed. Thus, one or more embodiments contemplate a number of different techniques for varying or modifying the intersection values determined at step 204.

In an embodiment, the number of spatial elements may be manipulated prior to applying the ray tracing algorithm. For example, one or more spatial elements may be subdivided into two or more sub spatial elements. In this case, the sub spatial elements are added to the originally defined spatial elements, and the method may proceed accordingly.

In an embodiment, the method also may include determining a first subset of the spatial elements directly intersected by the virtual rays. In this case, a second subset of the spatial elements intersected by reflected or refracted rays due to reflection or refraction of the virtual rays may be determined. Then the coverage may be determined in terms of both the first subset and the second subset. In other words, a discrimination may be made between direct rays that intersect a spatial element and indirect rays that intersect a spatial element. The differences between the number of direct and indirect intersecting rays may then be used as a basis for modifying one or more real world sensors or the paths taken by robots in the corresponding real environment.

The method of FIG. 2 also may be applied to the optimization of real-world sensors or robots carrying sensors. For example, assume the virtual object corresponds to a real object having a real area, and the remote point corresponds to a real sensor configured to emit a real beam. In this case, the method also may include iteratively varying, until an optimization of the coverage value is achieved, at least one of the virtual rays to determine modified rays and a location of the remote point to determine a relocated remote point. Alternatively, the method also may include iteratively varying, until an optimization of the coverage value is achieved, an action. The action may include modifying a path of a robot mounting the real sensor, modifying a position of the real sensor, modifying the real sensor, adding an additional real sensor configured to emit a second real beam, changing a sampling rate of the real sensor, changing the real beam emitted by the real sensor based on where on the real beam intersects the real object, or other actions.

The process of optimization may be achieved by varying the sensor, the robot, the object, or combinations thereof, until the coverage of the object is within a pre-determined threshold range. Thus, the process of optimization is a quantitative process.

In the real world application, the dataset captured by a sensor may depend on the types of sensors on the robot which often include cameras, lidars, radars, thermal cameras, microphones and thus can capture videos, photographs, thermal photos, lidar point clouds and sound recordings. The captured data set also depends on the path or trajectory and orientation of the sensor along this trajectory is taken by the agent.

The extent and quality of the capture also requires knowing the extent of the coverage. For example, if large areas or volumes of the equipment (e.g., greater than some predetermined percentage of the total area or volume) were not "seen" by the sensor, the coverage could be deemed poor. The coverage could also be weighed by the "importance" of a given area. The "importance" is defined by to a predetermined value assigned to an area.

The method of FIG. 2 may be varied to account for the expected behavior of different sensors or the importance of a given area of the object. For example, more or fewer rays may be used by the ray tracing algorithm, the intersection values may be varied, or some other variation to the method of FIG. 2 may be made. The variations may change the coverage value determined at step 208, which in turn may be used to change how the real sensor, real object, or path of a robot may be varied.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

FIG. 3.1, FIG. 3.2, and FIG. 3.3 show an example of a method for quantification of sensor coverage using synthetic modeling and uses of the quantification, in accordance with one or more embodiments. The following example is for explanatory purposes and not intended to limit the scope of one or more embodiments.

FIG. 3.1 shows a model (300) that includes a virtual object (302). A remote point (304) indicates a predicted location of a sensor, which may be static or may be disposed on a robot. A ray tracing algorithm generates a number of rays (306) towards the virtual object (302). A number of spatial elements, such as spatial element (308) and spatial element (310) have been defined for the virtual object (302). Note that while the spatial elements shown in FIG. 3.1 are uniform in shape, in different embodiments the spatial elements may have different sizes and shapes, or may be formed from different polygon types (e.g., triangles).

An intersection value is generated for each of the spatial elements. For example, spatial element (308) has an intersection value of "2" because two of the rays intersect the spatial element (308). Likewise, the spatial element (310) has an intersection value of "0" because no rays intersect the spatial element (310).

The intersection values of the spatial elements are tracked on a spatial element by spatial element basis. The overall coverage of the virtual object (302) may then be determined from the set of intersection values for the set of spatial elements. Additionally, an estimation may be made regarding which spatial elements have too little coverage (relative to a predetermined value) and which spatial elements have too much coverage (relative to another predetermined value).

FIG. 3.2 shows a real environment (320) in which a real object (322) is located. A robot (324) mounts a beam emitter (326) that directs one or more real beams (328) at the real object (322). In the example of FIG. 3.2, the beam emitter (326) is a light beam emitter.

A portion (330) of the real object (322) is covered by the real beams (328). One or more receiving sensors, such as sensor (332) disposed on the robot (324), may receive return beams that reflect, refract, or scatter from the surface of the real object (322). In addition, the robot (324) takes a path (334) when moving about the real environment (320). As the robot (324) moves, the real beams (328) cover different parts of the real object (322). Movement of the robot (324) may effect different beam coverage amounts on different parts of the real object (322) as the location of the robot (324) varies.

In the example, it is desirable to optimize the coverage of the real beams (328) over the real object (322). Thus, the method of FIG. 2 is performed in a model space that includes a model of the real object (322) and a ray tracing algorithm that represents the beams being emitted by the real sensor (332). From varying the behavior of the virtual representations of the real sensor (332), the robot (324), and the path (334) of the robot, sensor setting(s), robot path, sensor placement(s), and sensors types may be varied to find an optimum coverage of the rays on the virtual object.

The corresponding changes in the virtual objects may then be translated into real changes in the real objects. Thus, the path (334) of the robot (324) may be varied, the sampling frequency of the beam emitter (326) may be varied, the type of the sensor (332) may be changed to a more sentinel sensor type, the location of the real sensor (332) may be varied, and still other changes be made (such as for example adding a static sensor mounted to the real object (322)). The corresponding real changes optimize the real coverage of the real beams (328) over the real object (322). In this manner, the efficiency and accuracy of sensing may likewise be improved.

FIG. 3.1 and FIG. 3.2 show taking two dimensional measurements of the surface of the real object (322). However, the method of FIG. 2 also may be applied in a three-dimensional context.

For example, referring to FIG. 3.3, a three-dimensional model (350) containing a three-dimensional virtual object (352) may be used in the method of FIG. 2, as shown in FIG. 3.3. In this case, the remote point (354) may direct rays (356) at a three dimensional volume of spatial elements, such as spatial element (358). In this case, an intersection value is counted whenever one of the rays enters some portion of one of the three-dimensional spatial elements. The coverage is then evaluated in a three-dimensional environment. The method of FIG. 2 is then performed, but this time a volumetric coverage is performed (i.e., determining both the two-dimensional coverage and third dimensional depth of penetration of the rays (356)). In this example, a weighting scheme may be used to account for the attenuation of the rays (356) according to a depth of penetration of the rays (356) under the assumption that real beams may be subject to absorption, reflection, and scattering from a real object.

In a practical example, the embodiment of FIG. 3.3 may be an ultrasound application. For example, the real sensor that corresponds to the remote point (354) is an ultrasound device. The beams are sound waves at a frequency above which a human ear can detect the sound waves. The sound waves cover a surface area of the real object that corresponds to the three-dimensional virtual object (352). Additionally the "coverage" of the depth of penetration of the sound ways may be evaluated. In an embodiment, it is possible to optimize the penetration coverage of the remote point by varying the rays or the position of the remote point until a desired depth of penetration coverage is determined.

Corresponding changes in the real world may then be implemented. For example, the ultrasound device may be modified to change the frequency or volume of the ultrasound in order to achieve a desired depth of coverage within the real object that corresponds to the three-dimensional virtual object (352).

The examples of FIG. 3.1 through FIG. 3.3 may be further varied. Additionally, one or more embodiments may be described alternatively as follows.

For example, one or more embodiments may be described as relating to visual and quantitative methods for analyzing trajectories of robots carrying sensors for sensing. One or more embodiments may use a combination of ray tracing (path tracing), score counting, orientation sensitivity, and barycentric coordinates or a combination thereof to determine a coverage value. Once a coverage value is determined, the coverage value may be used to determine the optimal trajectories for robots for a given payload of sensors, or vice versa, and determine the resolution, range and capabilities needed on the sensors to have the desired coverage on a given trajectory or a combination of the two.

In general, three-dimensional objects may be modeled or represented as made up of a collection of points, lines, polygons, or volume elements. In a simulation using the orientation and field of view of the sensor, one or more embodiments may send rays in the 3D scene and find intersections with the model elements.

For each element hit (i.e., for each model element intersected by a ray), one or more embodiments keep a score that is incremented to measure how many times that element was "seen" by the ray. In other words, the metric being recorded is the number of times a model element (e.g., a triangle in the tessellation) is intersected by a ray of light emitted by the sensing device. The visual characteristics of the elements may vary over time in the form of a heat map that in which the lighting of different spatial elements varies with time. For example, the color of the 3D elements may vary over time based on how many times the elements were hit. For example, if a model element is "seen" by a ray three times the model element may be colored green, but if "seen" by the ray one time, the model element may be colored red. The number of times the rays are fired at the scene depends on a sampling frequency of the remote point, which may correspond to a sampling frequency of a corresponding real sensor.

The feedback from this method may be a mesh whose colors are changed based on the number of ray intersections in each spatial element of the mesh. See, for example, FIG. 3.1, where the sensed area is illuminated in a lighter shade of red. Areas not exposed to the scan are left at their original color. By taking a ratio of the sum of the areas of spatial elements that were hit over the total area one or more embodiments can determine an estimate of the percentage coverage. From area, one or more embodiments determine an absolute estimate in square length units as well.

One or more embodiments also can measure the angle of the hits, and can use the angles to determine how much any given hit should be considered as providing coverage. For example, a hit that is at a grazing angle to the surface may be given a different weight than a hit at right angle to the surface. Other attributes of a hit can be distance from the sensor, the source. For example, the farther the source is from the hit point, the less the hit is weighed.

One or more embodiments also may consider the surface properties of the piece of equipment that is hit. For example, if the surface that is hit is a black, absorbing material, the surface may not reflect light or laser as much as whiter and brighter surfaces. Hence, a black surface may call for a greater number of hits before coverage is deemed adequate. In another example, when evaluating volumes, the opacity, transmissivity, reflectivity, refractivity, or other physical properties may be used to affect rays when the rays pass through or interacts with a voxel in the volume.

Surfaces or volumes also may be associated with probabilities or uncertainties. The probabilities or uncertainties may be used to predict and the behavior of light rays within a given volume. For example, a ray might be reflected 60% of the time from an object in a volume, as opposed to a 100%, if the object has a 60% certainty of being present. This approach may be particularly useful for dynamic models, which could be people or other equipment being moved around the sensor-monitored area.

For large spatial elements, a barycentric coordinate system for the spatial elements may be used to decide how much of a given spatial element is covered. Large or flat surfaces may have been initially modeled with a few larger spatial elements. Keeping track of the number of hits in a large spatial element may not give a good estimate of the area covered. One or more embodiments may subdivide the larger spatial elements into smaller spatial elements as one way around this issue. In another embodiment, the convex hull of the U, V, W coordinates of the hits may be taken. The ratio of the volume of the convex hull to that of the whole cube may be used as a measure of coverage.

Some types of sensors may emit energy that bounces on reflections and refractions. One or more embodiments can account for these phenomena by simulating ray bounces. Thus, one or more embodiments can provide additional information about the coverage based on direct or indirect hits.

In some cases where a robot path is such that it is difficult to look at a certain pieces of equipment with a direct beam, a reflected beam might be able to provide the desired coverage. When a hit is noted, one or more embodiments can detect whether the hit came from the source directly or from a reflected (or refracted) ray. Hence, it is possible to know if the hit is a direct or indirect hit. When computing the coverage, one or more embodiments can breakdown the coverage in terms of direct or indirect coverage.

One or more embodiments contemplate that beams may not be straight lines. Thus, one or more embodiments can model a ray as a curved path, such as a projectile path. This approach could be useful when bending of beams occurs, such as when sound waves travel through layers of different densities of material. In another example, light may bend as the light passes through layers of air on a hot day.

Another way the beam can by modeled is by modeling the virtual ray as being deflected by electromagnetic deflections. Thus, the virtual rays may be bent to account for the path that real light beams may be changed due to magnetic fields.

One or more embodiments be used to decide how to orient a piece of equipment during facility design so that robot-based or statically emplaced sensors can capture more of the areas that would otherwise be occluded. One or more embodiments could be also used to design optimal painting applications where the thickness of the paint would be equivalent of the "coverage." In multi-robot scenarios, one or more embodiments could be used to define an optimal route considering the route and payloads of combinations of multiple robots. In situations where exposure control is desirable, such when using X-rays or other types of potentially harmful radiation, one or more embodiments may be useful to find minimal exposure paths in areas where minimal exposure to the beams is desired.

There may be different measures of quality. Measures of quality include coverage (the amount of area of a target sensed, or the number of sensor hits on a sensed target), time (whether enough samples are obtained), routing (the path taken by the sensing device), and others. The measures of quality may be modeled, as described with respect to FIG. 2.

Attention is now turned to converting a quantified scan evaluation to an improved path for a robot configured to perform a sensing operation of an area. A computer assisted design (CAD) model of equipment (e.g., the robot) may be used for sensing. The CAD model may be tessellated into a number of spatial elements (e.g., triangles).

One or more embodiments also contemplate the use of other geometrical shape for tessellating sub-areas of a surface or volume scanned. An n-sides polygon may be selected and used, for example. In some cases, points can be used to represent a surface. The points represent corresponding real sensing processes such as RADAR, LIDAR, structured light, photogrammetry, spectroscopy, etc. In addition, the computer assisted design (CAD) model may be voxelated (i.e., segmented into voxels) for volumetric studies in three dimensions. For example, gas leak detection would be one example where the volume is more relevant than the surface measurement.

A heuristic algorithm within the modeling space may be applied to determine whether it is more likely to improve the number of hits, to be closer to a pre-determined number of hits, by moving the robot further or closer to the target area, and then performing another run and taking another set of measurements. One or more embodiments determine if the scores improves or degrades, relative to the pre-determined number of hits. The process continues until an optimal number of hits is achieved in the set of spatial elements across desired illuminated areas along a new path set for the robot. The new path is then the optimized path to be taken by the robot in order to achieve the optimal sensing coverage of a facility.

As indicated above, the quantification of the coverage of the object by a mobile or stationary sensor can be used in finding optimal paths of robots or in finding optimal mounting locations for sensors. One of the methods for optimizing coverage could be to use a reinforcement learning approach.

A reward and penalty strategy may be used to find a set of changes that optimize coverage. The method of FIG. 2 is performed multiple times, once for each change or variation. The returned coverage value for each iteration of FIG. 2 may be a combined scalar value or a multi-value vector. For example, if the surface area covered, at, over and under the desired redundancy and by how much were tracked, the following vector ay be used:

$$<A\_opt, A\_under, A\_over>. \tag{1}$$

If it is desirable to track additional quantification of under-coverage, the feature of "A_under" may be further broken down into the following sub-vector:

$$A\_super\_under, A\_normal\_under, A\_just\_under. \tag{2}$$

Similarly the feature of "A_over" may be further broken down into the following sub-vector:

$$A\_super\_over, A\_normal\_over \text{ and } A\_just\_over. \tag{3}$$

The resulting vector may be a seven-tuple vector that could be used to decide what the reward or penalty should be. The seven-tuple vector may be:

$$<A\_opt, A\_super\_under, A\_normal\_under, A\_just\_under, A\_super\_over, A\_normal\_over, A\_super\_over>. \tag{4}$$

An example of a coverage vector where 75% was at coverage, 15% was under coverage, and 10% was over coverage is as follows:

$$<0.75, 0.15, 0.10>. \tag{5}$$

If the 15% under was further as 5% as super_under, 7% at normal_under, and 3% as just_under, and the 10% under was further broken as 2% super_under, 6% as normal_under, 2% as normal_under, then the resulting seven-tuple vector may be:

$$<0.75, 0.05, 0.07, 0.03, 0.02, 0.06, 0.02> \tag{6}$$

These vector values can then be used in a reward computation function, where different weightages are given to each of the corresponding features. The reward or penalty assigned to each feature may thus be provided to favor, or disfavor, certain degrees of over coverage or under coverage during the optimization process.

An example of weights for a rewards computation may be as follows:

$$<1.0, -0.1, -0.04, -0.02, -0.1, -0.02, -0.01>. \tag{7}$$

The weights vector of vector (7) may be multiplied by the feature vector of vector (6) to determine the actual values of the features.

The weights may be further varied to account for other factors anticipated to be an issue in the corresponding real world. Other factors that would be included in the reward or penalty scheme may be the total length of the distance travelled as that related directly to the battery life of a sensor or a robot, the properties of the correspond real object (as described above), and still other considerations.

The weights also may be varied based on a pre-determined "importance" of the area. In this case the virtual object may be broken up into a collection of zones. Each zones represents a pre-determined importance of that zone. Each zone's reward or penalty may be computed or determined, and then applied as another weight to the weight vector, such as the vector (7) above.

One or more embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 4.1, the computing system (400) may include one or more computer processor(s) (402), non-persistent storage device(s) (404), persistent storage device(s) (406), a communication interface (412) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) (402) may be one or more cores or micro-cores of a processor. The computer processor(s) (402) includes one or more processors. The computer processor(s) (402)

may include a central processing unit (CPU), a graphics processing unit (GPU), a tensor processing unit (TPU), combinations thereof, etc.

The input device(s) (410) may include a touchscreen, keyboard, mouse, microphone, touchpad, electronic pen, or any other type of input device. The input device(s) (410) may receive inputs from a user that are responsive to data and messages presented by the output device(s) (408). The inputs may include text input, audio input, video input, etc., which may be processed and transmitted by the computing system (400) in accordance with one or more embodiments. The communication interface (412) may include an integrated circuit for connecting the computing system (400) to a network (not shown) (e.g., a local area network (LAN), a wide area network (WAN) such as the Internet, mobile network, or any other type of network) or to another device, such as another computing device, and combinations thereof.

Further, the output device(s) (408) may include a display device, a printer, external storage, or any other output device. One or more of the output devices may be the same or different from the input device(s) (410). The input and output device(s) may be locally or remotely connected to the computer processor(s) (402). Many different types of computing systems exist, and the aforementioned input and output device(s) may take other forms. The output device(s) (408) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (402), is configured to perform one or more embodiments, which may include transmitting, receiving, presenting, and displaying data and messages described in the other figures of the disclosure.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422), node Y (424)) in the network (420) may be configured to provide services for a client device (426), including receiving requests and transmitting responses to the client device (426). For example, the nodes may be part of a cloud computing system. The client device (426) may be a computing system, such as the computing system shown in FIG. 4.1. Further, the client device (426) may include or perform at least a portion of one or more embodiments.

The computing system of FIG. 4.1 may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited by the attached claims.

What is claimed is:

1. A method comprising:

receiving a data structure comprising a model including a virtual object, wherein the virtual object comprises a plurality of spatial elements that form an area of the virtual object;

applying a ray tracing algorithm to the model, wherein the ray tracing algorithm directs a plurality of virtual rays from a remote point in the model towards the virtual object;

determining a plurality of intersection values, wherein each of the plurality of intersection values represents a corresponding number of times that the plurality of virtual rays intersect a corresponding one of the plurality of spatial elements;

generating, based on the plurality of intersection values, a heat map showing a plurality of colors, each color corresponding to a respective spatial element of the plurality of spatial elements, wherein the plurality of colors comprises a first color representing a first intersection value of the plurality of intersection values exceeding a threshold value or a second color representing a second intersection value of the plurality of intersection values below the threshold value;

generating, from the plurality of intersection values, a coverage value representing a percentage of the area that is covered by the plurality of virtual rays; and returning the coverage value.

2. The method of claim 1, wherein:

the virtual object corresponds to a real object having a real area;

the remote point corresponds to a real sensor configured to emit a real beam;

the method further comprises adjusting, based on the coverage value, the real sensor; and the adjusting the real sensor changes a corresponding percentage of the real area of the real object covered by the real beam emitted by the real sensor.

3. The method of claim 2, wherein;

the real sensor comprises a plurality of real sensors disposed on a robot; and the adjusting the real sensor comprises modifying at least one of the plurality of real sensors.

4. The method of claim 1, wherein:

the virtual object corresponds to a real object having a real area;

the remote point corresponds to a real sensor configured to emit a real beam;

the real sensor comprises a static sensor;

the method further comprises adjusting, based on the coverage value, the real sensor by adjusting at least one of a position of the real sensor, a sampling rate of the real sensor, or an operation of the real sensor; and the adjusting the real sensor changes a corresponding percentage of the real area of the real object covered by the real beam emitted by the real sensor.

5. The method of claim 4, wherein the real sensor comprises a plurality of real sensors disposed on a robot, and wherein adjusting comprises modifying at least one of the plurality of real sensors.

6. The method of claim 1, wherein:

the virtual object corresponds to a real object having a real area;

the remote point corresponds to a real sensor disposed on a robot and configured to emit a real beam;

the method further comprises adjusting, based on the coverage value, the real sensor by adjusting a movement path taken by the robot; and the adjusting the real sensor changes a corresponding percentage of the real area of the real object covered by the real beam emitted by the real sensor.

7. The method of claim 1, further comprising modifying at least one of the plurality of intersection values based on:

an estimated scattering property of a real object corresponding to the virtual object;

an estimated refraction property of the real object which corresponds to the virtual object;

an estimated reflection property of the real object which corresponds to the virtual object;

an estimated absorption property of the real object which corresponds to the virtual object; and an estimated bounce property of a real beam emitted by a real sensor.

8. The method of claim 1, further comprising modifying at least one of the plurality of intersection values based on at least one of:

angles at which the plurality of virtual rays intersect the plurality of spatial elements, or a distance between the remote point and the virtual object.

9. The method of claim 1 further comprising, prior to applying the ray tracing algorithm:

subdividing a spatial element of the plurality of spatial elements into a plurality of sub spatial elements; and adding the plurality of sub spatial elements to the plurality of spatial elements.

10. The method of claim 1, further comprising:

determining a first subset of the plurality of spatial elements directly intersected by the plurality of virtual rays;

determining a second subset of the plurality of spatial elements intersected by reflected or refracted rays due to reflection or refraction of the plurality of virtual rays; and characterizing the coverage value in terms of both the first subset and the second subset.

11. The method of claim 1, wherein the plurality of virtual rays comprises at least one of straight rays or curved rays.

12. The method of claim 1, wherein:

the virtual object corresponds to a real object having a real area;

the remote point corresponds to a real sensor configured to emit a real beam;

the real sensor comprises at least a first sensor mounted on a robot and a second sensor that is statically mounted relative to the real object;

the method further comprises adjusting, based on the coverage value, at least one of a path of the robot or an orientation or position of the second sensor; and the adjusting changes a corresponding percentage of the real area of the real object covered by the real beam emitted by at least one of the first sensor or the second sensor.

13. The method of claim 12, further comprising modifying at least one of the plurality of intersection values based on at least one of:

an estimated scattering property of the real object which corresponds to the virtual object;

an estimated refraction property of the real object which corresponds to the virtual object;

an estimated reflection property of the real object which corresponds to the virtual object;

an estimated absorption property of the real object which corresponds to the virtual object; or an estimated bounce property of the real beam emitted by the real sensor.

14. The method of claim 12, further comprising modifying at least one of the plurality of intersection values based on at least one of:

angles at which the plurality of virtual rays intersect the plurality of spatial elements; or a distance between the remote point and the virtual object.

15. The method of claim 12 further comprising, prior to applying the ray tracing algorithm:

subdividing a spatial element of the plurality of spatial elements into a plurality of sub spatial elements; and adding the plurality of sub spatial elements to the plurality of spatial elements.

16. The method of claim 12, further comprising:

determining a first subset of the plurality of spatial elements directly intersected by the plurality of virtual rays;

determining a second subset of the plurality of spatial elements intersected by reflected or refracted rays due to reflection or refraction of the plurality of virtual rays; and characterizing the coverage value in terms of both the first subset and the second subset.

17. The method of claim 1, wherein:

the virtual object corresponds to a real object having a real area;

the remote point corresponds to a real sensor configured to emit a real beam; and the method further comprises iteratively varying, until an optimization of the coverage value is achieved, at least one of:

the plurality of virtual rays to determine a modified plurality of rays; and a location of the remote point to determine a relocated remote point.

18. The method of claim 17, further comprising performing, based on at least one of the modified plurality of rays and the relocated remote point, an action comprising at least one of:

modifying a path of a robot mounting the real sensor;

modifying a position of the real sensor;

modifying the real sensor;

adding an additional real sensor configured to emit a second real beam;

changing a sampling rate of the real sensor; or changing the real beam emitted by the real sensor based on where on the real beam intersects the real object.

19. A system comprising:

a data repository storing a data structure comprising a model of a virtual object, wherein the virtual object comprises a plurality of spatial elements that form an area of the virtual object; and a processor programmed to execute computer readable program code that performs a computer-implemented method comprising:

receiving the data structure comprising the model including the virtual object, wherein the virtual object comprises the plurality of spatial elements that form the area of the virtual object;

applying a ray tracing algorithm to the model, wherein the ray tracing algorithm directs a plurality of virtual rays from a remote point in the model towards the virtual object;

determining a plurality of intersection values, wherein each of the plurality of intersection values represents a corresponding number of times that the plurality of virtual rays intersect a corresponding one of the plurality of spatial elements;

generating, based on the plurality of intersection values, a heat map showing a plurality of colors, each color corresponding to a respective spatial element of the plurality of spatial elements, wherein the plurality of colors comprises a first color representing a first intersection value of the plurality of intersection values exceeding a threshold value or a second color representing a second intersection value of the plurality of intersection values below the threshold value;

generating, from the plurality of intersection values, a coverage value representing a percentage of the area that is covered by the plurality of virtual rays; and returning the coverage value.

20. A non-transitory computer readable storage medium storing program code that, when executed by a processor, performs a computer-implemented method comprising:

receiving a data structure comprising a model including a virtual object, wherein the virtual object comprises a plurality of spatial elements that form an area of the virtual object;

applying a ray tracing algorithm to the model, wherein the ray tracing algorithm directs a plurality of virtual rays from a remote point in the model towards the virtual object;

determining a plurality of intersection values, wherein each of the plurality of intersection values represents a corresponding number of times that the plurality of virtual rays intersect a corresponding one of the plurality of spatial elements;

generating, based on the plurality of intersection values, a heat map showing a plurality of colors, each color corresponding to a respective spatial element of the plurality of spatial elements, wherein the plurality of colors comprises a first color representing a first intersection value of the plurality of intersection values exceeding a threshold value or a second color representing a second intersection value of the plurality of intersection values below the threshold value;

generating, from the plurality of intersection values, a coverage value representing a percentage of the area that is covered by the plurality of virtual rays; and returning the coverage value.

* * * * *